US009156465B1

(12) United States Patent
Zumbusch

(10) Patent No.: US 9,156,465 B1
(45) Date of Patent: Oct. 13, 2015

(54) BRAKE-ASSIST-STEERING SYSTEM

(71) Applicant: Eaton Corporation, Cleveland, OH (US)

(72) Inventor: Steven John Zumbusch, Chanhassen, MN (US)

(73) Assignee: EATON CORPORATION, Cleveland, OH (US)

( * ) Notice: Subject to any disclaimer, the term of this patent is extended or adjusted under 35 U.S.C. 154(b) by 0 days.

(21) Appl. No.: 14/217,636

(22) Filed: Mar. 18, 2014

Related U.S. Application Data

(60) Provisional application No. 61/803,911, filed on Mar. 21, 2013.

(51) Int. Cl.
*G06F 19/00* (2011.01)
*B60W 10/20* (2006.01)
*B60W 10/184* (2012.01)

(52) U.S. Cl.
CPC ............. *B60W 10/20* (2013.01); *B60W 10/184* (2013.01)

(58) Field of Classification Search
CPC ... B60T 8/1764; B60T 8/17636; B60T 8/246; B60K 17/344; B60K 28/16; E02F 3/844; E02F 9/2029; E02F 9/2004; G05D 1/0272

USPC ........... 701/1, 70, 73, 74, 41; 303/150; 172/3, 172/7, 26; 180/169, 336

See application file for complete search history.

(56) References Cited

U.S. PATENT DOCUMENTS

| | | | |
|---|---|---|---|
| 6,272,417 B1 * | 8/2001 | Ross et al. | 701/71 |
| 6,377,885 B2 * | 4/2002 | Yasui et al. | 701/80 |
| 6,928,355 B2 * | 8/2005 | Nihei et al. | 701/71 |
| 6,940,423 B2 * | 9/2005 | Takagi et al. | 340/932.2 |
| 7,059,687 B2 * | 6/2006 | Yasui et al. | 303/113.5 |
| 7,520,572 B2 * | 4/2009 | Hatipoglu et al. | 303/3 |
| 8,224,546 B2 * | 7/2012 | Terasaka | 701/73 |
| 8,744,715 B2 * | 6/2014 | Takemori et al. | 701/74 |
| 2009/0120714 A1 * | 5/2009 | Hisanaga et al. | 180/446 |
| 2013/0038118 A1 | 2/2013 | Brinkley et al. | |

* cited by examiner

*Primary Examiner* — McDieunel Marc
(74) *Attorney, Agent, or Firm* — Jarett D. Millar

(57) ABSTRACT

A method of operating a brake-assist-steering system of a vehicle comprises the steps of receiving a signal from a wheel position detector. A theoretical wheel speed for an inside non-steered wheel is computed. A brake operably associated with the inside non-steered wheel is actuated when an actual wheel speed of the inside non-steered wheel is greater than the theoretical wheel speed of the inside non-steered wheel.

6 Claims, 4 Drawing Sheets

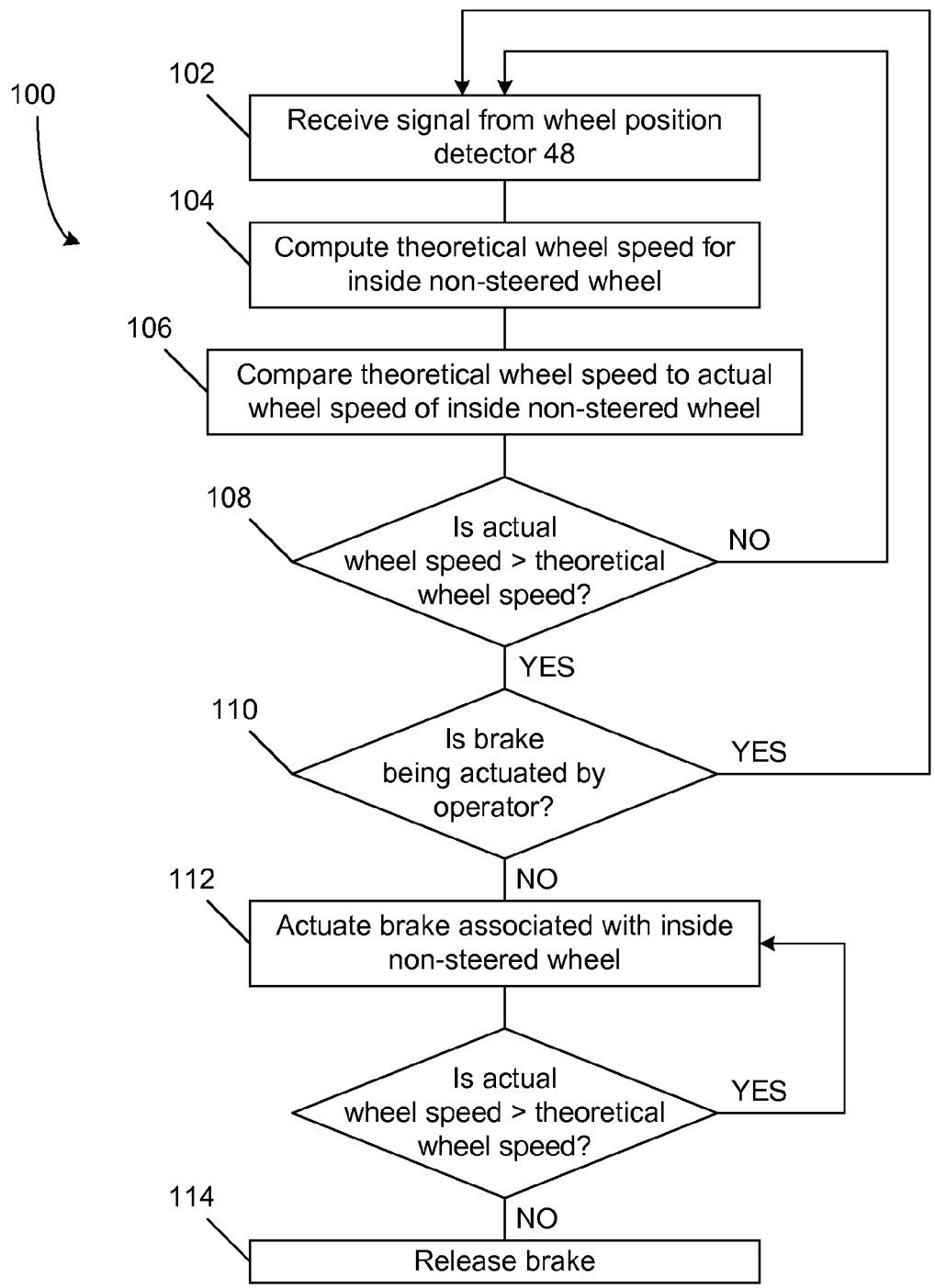

BRAKE-ASSIST-STEERING SYSTEM

CROSS-REFERENCE TO RELATED APPLICATION

The present disclosure claims priority to U.S. Provisional Patent Application Ser. No. 61/803,911, filed on Mar. 21, 2013 and entitled "Brake-Assist-Steering System," the disclosure of which is hereby incorporated by reference in its entirety.

BACKGROUND

Due to the size, weight and/or geometry of many off-highway vehicles, the turning effectiveness of a vehicle may be less than required in certain conditions. For example, if the conditions in which an off-highway vehicle is used are muddy, the vehicle may not follow the commanded turn. One way in which operators of these vehicles improve turning effectiveness is to apply the vehicle brakes during the turn. However, by applying the vehicle brakes too much or too little during the turn, efficiency of the vehicle can be compromised.

SUMMARY

An aspect of the present disclosure relates to a method of operating a brake-assist-steering system of a vehicle. The method comprises the steps of receiving a signal from a wheel position detector. A theoretical wheel speed for an inside non-steered wheel is computed. A brake operably associated with the inside non-steered wheel is actuated when an actual wheel speed of the inside non-steered wheel is greater than the theoretical wheel speed of the inside non-steered wheel.

Another aspect of the present disclosure relates to a vehicle. The vehicle includes a plurality of steered wheels and a plurality of non-steered wheels. A plurality of brakes is coupled to the plurality of wheels. A steering device is operably coupled to the plurality of steered wheels for steering the steered wheels. A brake-assist-steering system is operably associated with the plurality of non-steered wheels. The brake-assist-steering system includes a wheel position detector that is adapted to provide a signal representative of a steered angle of the plurality of steered wheels. A plurality of wheel sensors is adapted to provide a signal representative of actual wheel speeds of the plurality of non-steered wheels. A controller is in electrical communication with the wheel position detector and the plurality of wheel speed sensors. The controller actuates a brake operably associated with an inside non-steered wheel of the plurality of non-steered wheels when an actual wheel speed of the inside non-steered wheel is greater than a theoretical wheel speed of the inside non-steered wheel.

Another aspect of the present disclosure relates to a method of operating a brake-assist-steering system of a vehicle. The method comprises the steps of receiving a signal from a wheel position detector. A theoretical wheel speed for an inside non-steered wheel is computed. The theoretical wheel speed of the inside non-steered wheel is a function of a steered angle, wheel base and track width. The actuation status of a brake operably associated with the inside non-steered wheel is established. A brake operably associated with the inside non-steered wheel is actuated when an actual wheel speed of the inside non-steered wheel is greater than the theoretical wheel speed of the inside non-steered wheel and the brake is not being actuated by an operator. The brake operably associated with the inside non-steered wheel is released when the actual wheel speed of the inside non-steered wheel is less than or equal to the theoretical wheel speed of the inside non-steered wheel.

Another aspect of the present disclosure relates to a vehicle. The vehicle includes at least one steered wheel and a plurality of non-steered wheels. A plurality of brakes is coupled to the plurality of wheels. A steering device is operably coupled to the at least one steered wheel for steering the at least one steered wheel. A brake-assist-steering system is operably associated with the plurality of non-steered wheels. The brake-assist-steering system includes a wheel position detector that is adapted to provide a signal representative of a steered angle of the at least one steered wheel. A plurality of wheel sensors is adapted to provide a signal representative of actual wheel speeds of the plurality of non-steered wheels. A controller is in electrical communication with the wheel position detector and the plurality of wheel speed sensors. The controller actuates a brake operably associated with an inside non-steered wheel of the plurality of non-steered wheels when an actual wheel speed of the inside non-steered wheel is greater than a theoretical wheel speed of the inside non-steered wheel.

DRAWINGS

FIG. 4 is a representation of a method for operating the brake-assist-steering system.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
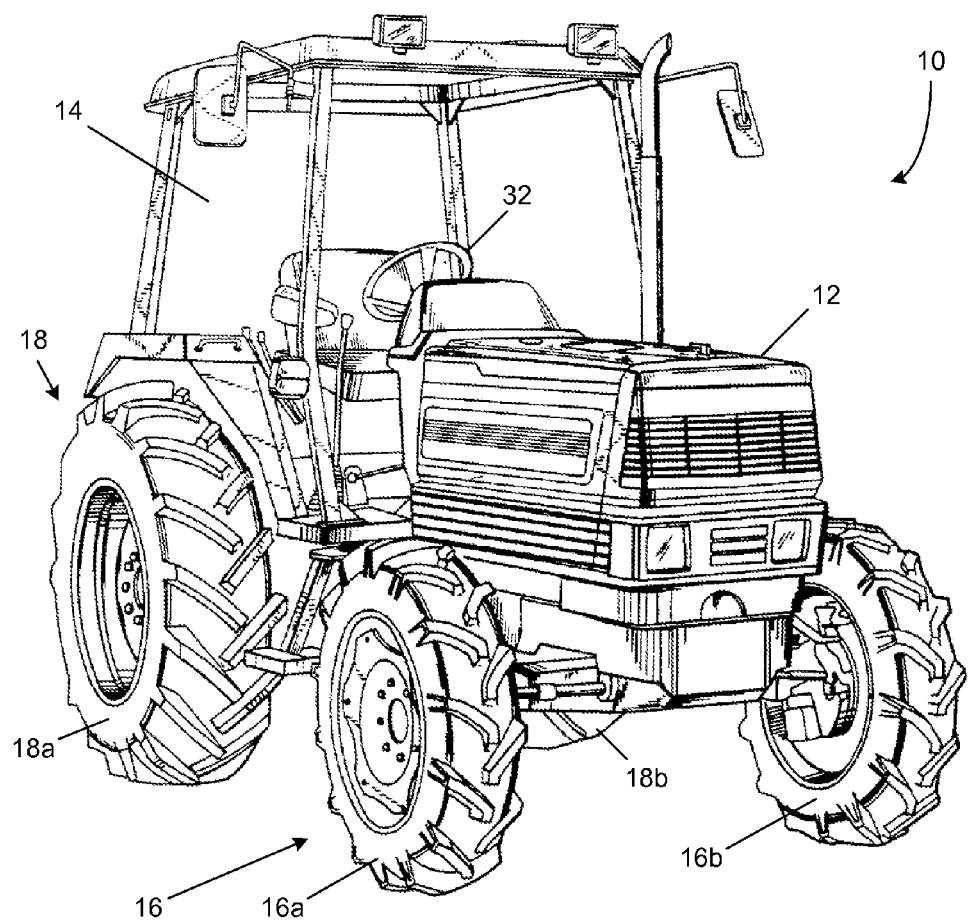
FIG. 1 is an isometric view of a vehicle having exemplary features of aspects in accordance with the principles of the present disclosure.
Figure 2:
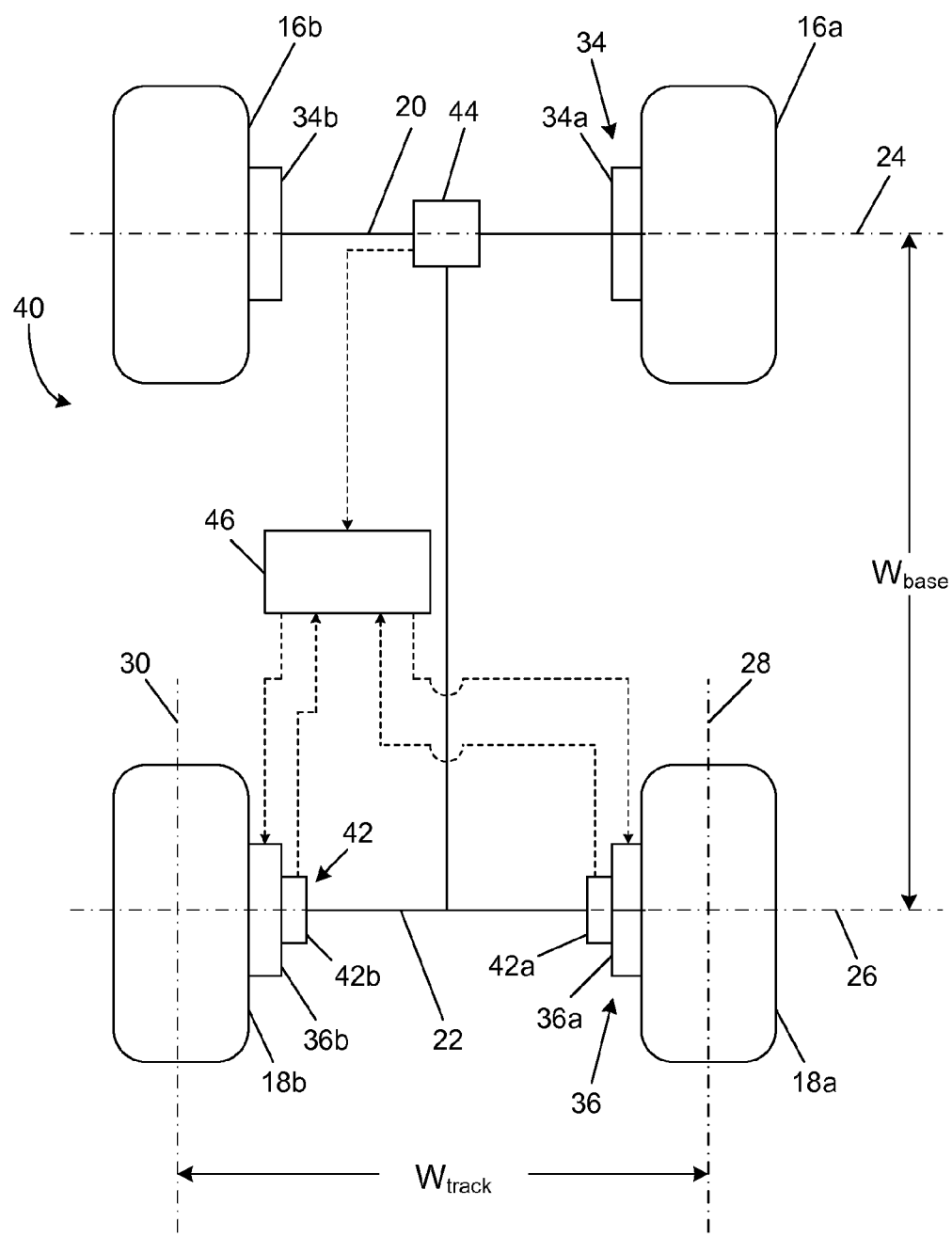
FIG. 2 is a schematic representation of a brake-assist-steering system suitable for use with the vehicle of FIG. 1.

Referring now to FIGS. 1 and 2, a vehicle 10 is shown. In the depicted embodiment, the vehicle 10 is an off-highway vehicle. The vehicle 10 includes a body 12. In the depicted embodiment, the body 12 defines an operator cabin 14, in which an operator can operate the vehicle 10.

The vehicle 10 includes at least one steered wheel 16 and a plurality of non-steered wheels 18. In the depicted embodiment, the vehicle 10 includes a plurality of steered wheels 16. In the depicted embodiment, the plurality of steered wheels 16 are front wheels and the plurality of non-steered wheels 18 are rear wheels. The plurality of steered wheels 16 includes a first steered wheel 16a and a second steered wheel 16b. In the depicted embodiment, the first steered wheel 16a is a right front wheel and the second steered wheel 16b is a left front wheel. The plurality of non-steered wheels 18 includes a first non-steered wheel 18a and a second non-steered wheel 18b. In the depicted embodiment, the first non-steered wheel 18a is a right rear wheel and the second non-steered wheel 18b is a left rear wheel. The plurality of steered wheels 16 is mounted to a first axle 20 while the plurality of non-steered wheels 18 is mounted to a second axle 22.

A first plane 24 extends through the centers of the first and second steered wheels 16a, 16b. A second plane 26 extends through the centers of the first and second non-steered wheels 18a, 18b. The first and second planes 24, 26 are parallel and offset from each other by a distance referred to as a wheel base $W_{base}$.

A third plane 28 extends through the center of the first non-steered wheel 18a and is perpendicular to the second plane 26. A fourth plane 30 extends through the center of the second non-steered wheel 18b and is perpendicular to the second plane 26. The third and fourth planes 28, 30 are parallel and offset from each other by a distance referred to as a track width $W_{track}$.

A steering device 32 is disposed in the operator cabin 14. In the depicted embodiment, the steering device 32 is a steering wheel. In the depicted embodiment, actuation of the steering device 32 is adapted to steer the plurality of steered wheels 16.

The vehicle 10 includes a plurality of steered wheel brakes 34 and a plurality of non-steered wheel brakes 36. The plurality of steered wheel brakes 34 includes a first steered wheel brake 34a associated with the first steered wheel 16a and a second steered wheel brake 34b associated with the second steered wheel 16b. The plurality of non-steered wheel brakes 36 includes a first non-steered wheel brake 36a associated with the first non-steered wheel 18a and a second non-steered wheel brake 36b associated with the second non-steered wheel 18b. In the depicted embodiment, the steered wheel and non-steered wheel brakes 34, 36 are friction type brakes.

Referring now to FIG. 2, a schematic representation of a brake-assist-steering system 40 suitable for use with the vehicle 10 is shown. The brake-assist-steering system 40 includes a plurality of wheel speed sensors 42, a wheel position detector 44 and a controller 46.

In the depicted embodiment, the plurality of wheel speed sensors 42 is operably associated with the plurality of non-steered wheels 18 of the vehicle 10. In the depicted embodiment, the plurality of wheel sensors 42 include a first non-steered wheel speed sensor 42a associated with the first non-steered wheel 18a and a second non-steered wheel speed sensor 42b associated with the second non-steered wheel 18b. The plurality of wheel speed sensors 42 is in electrical communication with the controller 46. The plurality of wheel speed sensors 42 is adapted to provide a signal to the controller 46 that is representative of wheel speed for the corresponding wheel being monitored by the wheel speed sensor 42.

The wheel position detector 44 is in electrical communication with the controller 46. The wheel position detector 44 is adapted to provide a signal to the controller 46 representative of a steered angle 48 of the steered wheels of the vehicle 10. In one embodiment, the wheel position detector 44 may be a kingpin sensor, a cylinder position sensor, a tie-rod sensor, or other type of mechanical or electrical device that can detect the position of the steered wheels.

The controller 46 is in electrical communication with the wheel speed sensors 42, the wheel position detector 44 and the plurality of non-steered wheel brakes 36. The controller 46 is adapted to receive signals from the wheel speed sensors 42 and the wheel position detector 44 and actuate only one of the first and second non-steered wheel brakes 36a, 36b.

Figure 3:
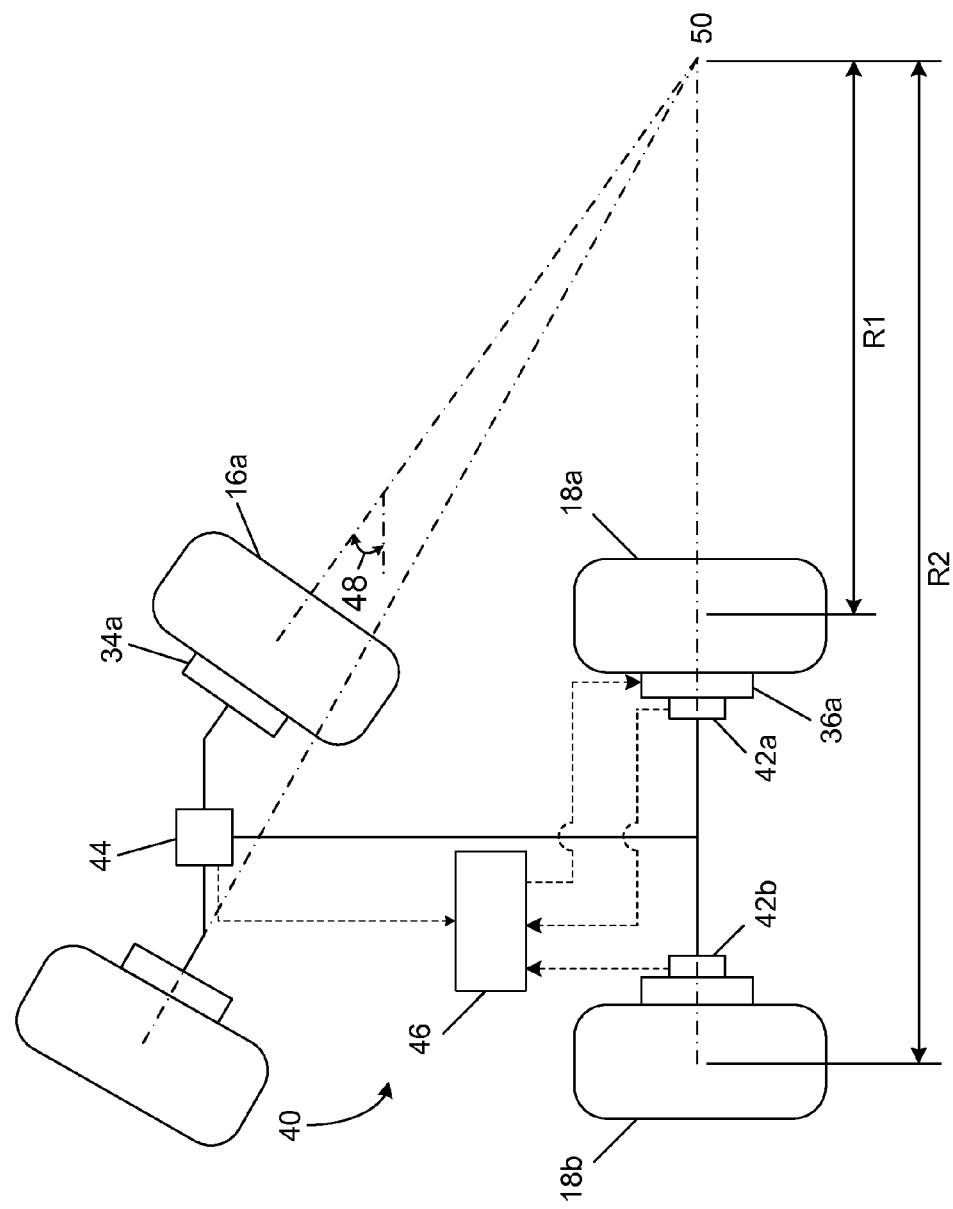
FIG. 3 is a schematic representation of the brake-assist-steering system when the vehicle is in a steered position.

Referring now to FIGS. 3 and 4, a method 100 of operation of the brake-assist steering system 40 will be described. The method 100 is adapted to only actuate a brake associated with the inside non-steered wheel of the vehicle when the speed of the inside non-steered wheel is greater than a threshold value. The threshold value is determined based on the steered angle, the wheel speed of the outer non-steered wheel, and the geometry of the vehicle.

In one embodiment, the steering device 32 is coupled to an electro-hydraulic steering system. When the steering device 32 is actuated, the electro-hydraulic steering system actuates the plurality of steered wheels 16 to a corresponding steered angle 48. In step 102, the controller 46 receives a signal from the wheel position detector 44 that is representative of the steered angle 48.

In step 104, the controller 46 computes the theoretical wheel speed $\Omega_{theo}$ for the inside non-steered wheel. The theoretical wheel speed $\Omega_{theo}$ of the inside non-steered wheel 18a is a function of the steered angle 48, the wheel speed of the outer non-steered wheel 18b as provided by wheel sensor 42b, and the vehicle geometry. In the depicted embodiment, the theoretical wheel speed $\Omega_{theo}$ is a function of the steered angle 48, the wheel speed of the outer non-steered wheel 18b, the wheel base $W_{base}$ of the vehicle 10 and the track width $W_{track}$ of the vehicle 10.

In the present disclosure, it will be understood that the inside non-steered wheel is the non-steered wheel with the shortest radius from the center of the turning circle 50. In the exemplary scenario depicted in FIG. 3, the first non-steered wheel 18a has a first radius R1 from the center of the turning circle and the second non-steered wheel 18b has a second radius R2 from the center of the turning circle. As the first radius R1 is less than the second radius R2, the first non-steered wheel 18a is the inside non-steered wheel for the present example.

In the present disclosure, it will be understood that the outside non-steered wheel is the non-steered wheel with the longest radius from the center of the turning circle 50. In the exemplary scenario depicted in FIG. 3, the second radius R2 is greater than the first radius R1. Therefore, the second non-steered wheel 18b is the outside non-steered wheel for the present example.

With the theoretical wheel speed $\Omega_{theo}$ of the inside non-steered wheel 18a calculated, the controller 46 compares the theoretical wheel speed $\Omega_{theo}$ to an actual wheel speed $\Omega_{act}$ of the inside non-steered wheel 18a as provided by the wheel speed sensor 42a for the inside non-steered wheel 18a in step 106. In step 108, the controller 46 determines whether the actual wheel speed $\Omega_{act}$ of the inside non-steered wheel is greater than the theoretical wheel speed $\Omega_{theo}$ of the inside non-steered wheel.

If the actual wheel speed $\Omega_{act}$ of the inside non-steered wheel 18a is greater than the theoretical wheel speed $\Omega_{theo}$ of the inside non-steered wheel 18a, the controller 46 checks the status of the brake operably associated with the inside non-steered wheel 18a in step 110 to establish whether the brake is being actuated by the operator of the vehicle. In the example depicted in FIG. 3, the first non-steered wheel brake 36a is the brake operably associated with the inside non-steered wheel 18a.

If the brake 36a associated with the inside non-steered wheel 18a is being actuated by the operator of the vehicle 10, the controller 46 takes no further action. If the brake 36a is not being actuated by the operator of the vehicle 10, the controller 46 actuates the brake that is associated with the inside non-steered wheel 18a in step 112.

The controller 46 actuates the brake associated with the inside non-steered wheel until the actual wheel speed of the inside non-steered wheel is equal to the theoretical wheel speed of the inside non-steered wheel. When the actual wheel speed of the inside non-steered wheel is equal to the theoretical wheel speed of the inside non-steered wheel, the controller 46 releases the brake associated with the inside non-steered wheel in step 114.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. An off-highway vehicle comprising:
   at least one steered wheel;
   a plurality of non-steered wheels;
   a plurality of brakes coupled to the plurality of non-steered wheels;
   a steering device operably coupled to the at least one steered wheel for steering the at least one steered wheel;
   a brake-assist-steering system operably associated with the plurality of non-steered wheels, the brake-assist-steering system including:
      a wheel position detector adapted to provide a signal representative of a steered angle of the at least one steered wheel;
      a plurality of wheel speed sensors adapted to provide a signal representative of actual wheel speeds of the plurality of non-steered wheels;
      a controller in electrical communication with the wheel position detector and the plurality of wheel speed sensors;
      wherein responsive to the controller only the brake that is coupled to an inside-non-steered wheel, which is disposed the shortest distance from a center of a turning circle of the vehicle, is actuated when an actual wheel speed of the inside non-steered wheel is greater than a theoretical wheel speed of the inside non-steered wheel and is released when the actual wheel speed of the inside non-steered wheel is less than or equal to the theoretical wheel speed of the inside non-steered wheel.

2. The off-highway vehicle of claim 1, wherein the off-highway vehicle is an agricultural vehicle.

3. The off-highway vehicle of claim 1, wherein the theoretical wheel speed of the inside steered wheel is a function of the steered angle and vehicle geometry.

4. The off-highway vehicle of claim 3, wherein the vehicle geometry includes a wheel base and a track width.

5. The off-highway vehicle of claim 1, wherein the controller establishes an engagement status of the brake operably associated with the inside non-steered wheel prior to actuating the brake.

6. The off-highway vehicle of claim 1, wherein the theoretical wheel speed of the inside steered wheel is a function of the steered angle, a wheel speed of an outside non-steered wheel, a wheel base of the off-highway vehicle, and a track width of the off-highway vehicle.

* * * * *